W. J. H. SCHROEDER.
TRUCK.
APPLICATION FILED FEB. 2, 1914.
1,124,178.                                                    Patented Jan. 5, 1915.
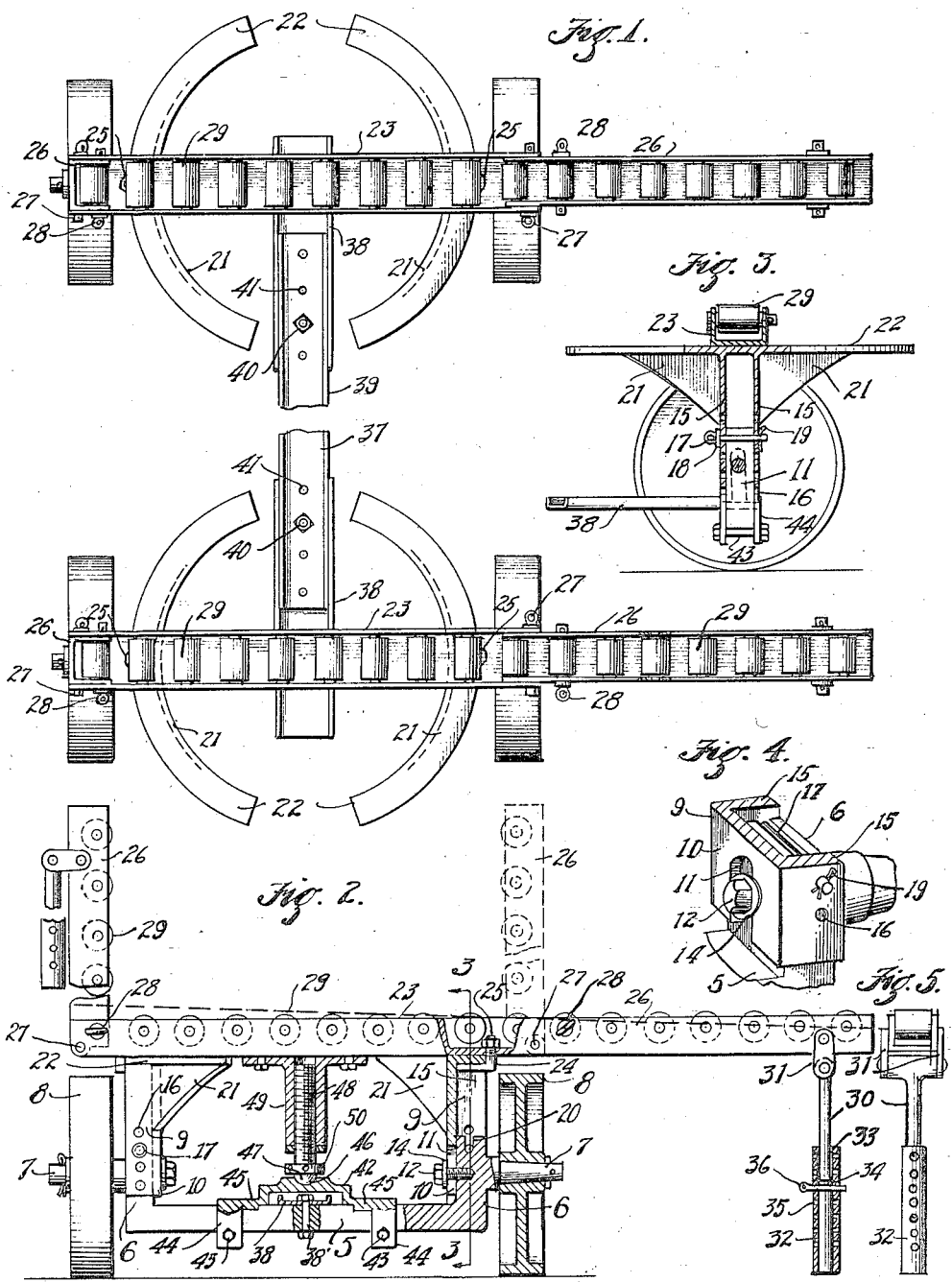

UNITED STATES PATENT OFFICE.

WILLIAM J. H. SCHROEDER, OF SAN PEDRO, CALIFORNIA.

TRUCK.

1,124,178.  Specification of Letters Patent.  Patented Jan. 5, 1915.

Application filed February 2, 1914. Serial No. 816,010.

*To all whom it may concern:*

Be it known that I, WILLIAM J. H. SCHROEDER, a citizen of the United States, residing at San Pedro, in the county of Los Angeles, State of California, have invented new and useful Improvements in Trucks, of which the following is a specification.

This invention relates to a truck, and particularly pertains to a truck for transporting lumber.

It is the object of this invention to provide a truck of the four wheel type having a pair of independent complementary frames supported one on the front axle and one on the rear axle, and which frames can be elevated in relation to the axles and canted longitudinally, with manually operable means for elevating the truck frames interposed between the frames and axles.

A further object is to provide a truck having a pair of tiltable lumber carrier frames provided with hinged side portions forming unloading skids when extended laterally and provide roller means on the lumber carrier frames and side portions to facilitate the discharge of the lumber therefrom when the sides are extended laterally and the frames canted.

A further object is to provide adjustable means for substantially connecting the truck frames to the axles and supporting them thereon adjacent the wheels.

The invention primarily resides in a truck having front and rear axles carried on wheels and connected together by an adjustable reach bar, adjustable standards carried by the axles adjacent the wheel spindles thereon a pair of transverse lumber carrying frames on said standards adapted to be detachably secured thereto, side frames hinged to said transverse frames adapted to be rigidly secured in either a horizontal or vertical position, rollers on the transverse frames and side frames, and means for canting the transverse frames to facilitate the discharge of a load therefrom on the rollers on a laterally extended side frame.

The invention is illustrated in the accompanying drawing, in which—

Figure 1 is a plan view of the truck showing the side frames on one side thereof in their lowered or horizontal position. Fig. 2 is a front elevation with parts broken away, showing the forward axle and the canting means partly in vertical section and elevation. Fig. 3 is a detail vertical section on the line 3—3 of Fig. 2. Fig. 4 is a detail in perspective showing the construction of one of the adjustable standards and the manner of mounting same. Fig. 5 is a detail end elevation of the side frame, showing the adjustable support therefor when in its horizontal position.

The present invention is essentially a four-wheeled truck and has correspondingly constructed front and rear portions connected together by an adjustable reach bar. As the front and rear portions are of like constructions, the description will be confined to the front portion, which is particularly illustrated in Fig. 2, and consists of an axle 5 of the low type, preferably rectangular in cross section and turned upward at its ends to form upright members 6 on the outer faces of which are formed the wheel spindles 7 on which the truck wheels 8 are revolubly mounted; the spindles 7 being disposed a short distance below the upper ends of the upright members 6. The upright portions 6 are rectangular in cross section and are designed to receive adjustable standards 9 which are formed with vertical plates 10 adapted to lie adjacent the inner vertical faces of the uprights 6 and having open-ended vertically extending slots 11 therein to receive threaded bolts 12 which pass through the slots 11 and are screwed into the upright portions 6; the heads of the bolts 12 engaging washers 14 spanning the slots 11 to rigidly clamp the plates 10 in position against the uprights 6. As a means for retaining the standards 9 against lateral movement, the plates 10 are formed with outwardly projecting flanges 15, which extend on opposite sides of the uprights 6, as particularly shown in Fig. 4, the standard thus being formed U-shaped in cross section.

The flanges 15 are formed with a series of vertically alined openings 16 adapted to receive a pin 17 which is adapted to be inserted through opposed openings 16, as shown in Fig. 3, and which pin is held in place by means of a shoulder 18 on one end thereof, and a removable cotter-pin 19 passed through an opening in the opposite end thereof; the flange 18 bearing against the outer face of one flange 15, and the cotter-pin against the outer face of the other flange 15. The pin 17 forms a support for the standards 9, and is designed to seat in a channel 20 formed in the upper face of the upright 6. The side walls of the channel extending on opposite sides of the pin 17 coöperate with the bolts 12 to rigidly hold the standards in place. The pins 17 also serve as pivotal supports for the standards when the latter are rocked as will presently be described.

Formed on the upper ends of the standards integral therewith, and braced by webs 21 are horizontally extending quadrant plates 22 forming turn-tables; the quadrants on the opposite standards 9 being disposed to face each other and preferably formed on arcs struck from the longitudinal center of the axle 5. Detachably mounted on the quadrant plates 22 and extending parallel with the axle 5 is a load supporting frame 23 formed of channel iron which is secured in place on the quadrant plates 22 by means of angle bolts 24 having horizontally extending portions adapted to engage the underside of the quadrant plates 22 and vertical portions projecting up and around the outer edges of the latter with their threaded upper ends passing through openings in the frame 23 for the reception of nuts 25 which are screwed thereon to clamp the frame 23 either in rigid or slidable relation to the quadrant plates.

Pivoted to the outer ends of the frames are side frames 26 which are connected to the ends of the frames 23 by means of removable pins 27 and are adapted to be turned on the pins 27 into either a vertical or horizontal position. The frames 26 when employed as side frames are retained in a vertical position by means of removable pins 28 which are inserted through perforations in the side flanges of the frame 23 and pass through corresponding perforations in the side flanges of the side frames 26. Mounted between the side flanges of the supporting frames 23 and side frames 26 is a series of rollers 29, the upper portions of which project a short distance beyond the upper edges of the side flanges of the frames. These rollers are provided for the purpose of facilitating the removal of the load carried by the frame.

Means are provided for forming an adjustable substantial support for the outer end of the side frames 26 when the latter are lowered into a horizontal position. This means consists of a leg 30 connected to a pair of links 31 arranged on opposite sides of the side frame 26 adjacent its outer end. The leg 30 is adapted to be adjusted in length, for which purpose its lower end telescopes with a sleeve 32 having an inturned flange 33 on its upper end engaging the periphery of the leg 30 which leg is formed with a flange 34 on its lower end slidably engaging the inner wall of the sleeve 32; the flanges 33 and 34 serving to prevent the sleeve 32 from separating from the leg 30 when the latter is elevated. The sleeve 32 is formed with a series of vertically arranged opposed perforations 35 for the reception of a pin 36, which, when passed through opposite perforations, will extend below the lower end of the leg 30 and form a support therefor.

The front and rear axles 5 of the truck are connected together by a longitudinally adjustable reach rod 37 here shown as consisting of channel irons 38, which are secured to the axles 5 in any suitable manner, and which channel irons receive the ends of a connecting channel iron 39, which is secured to the channel irons 38 in any desired position by means of bolts 40 which are passed through perforations 41 in the channel irons 39 and engaging corresponding perforations in the channel irons 38. The front axle 5 may be connected to the channel irons 38 by a king pin 38′ to permit pivoted movement of the front axle in relation to the reach rod in steering the truck. Mounted on the axle 5 is a load distributing saddle 42, which is held on the axle against displacement by means of bolts 43 passing through U-shaped extensions 44 on the ends of the saddle bar which extensions project on opposite sides of the axle 5 with the bolts connecting their lower ends below the underside of the axle 5. The saddle 42 is held against longitudinal movement on the axle 5 by means of ribs or projections 45 adjacent its outer ends and on its underside, which engage depressions in the upper face of the axle 5. The saddle 42 is bent upwardly at its center to bridge the channel iron 38 and is formed with a socket 46 on its upper face to receive a semi-cylindrical end 47 of a jack-screw 48, the upper portion of which is threaded and screwed in an internally threaded tubular hanger 49 rigidly mounted on the underside of the frame 23. The jack-screw 48 is provided with the usual perforated flange 50 for the reception of a bar by which the jack-screw can be rotated.

In the operation of the invention, the standards 9 are securely clamped on the upturned portions of the axle so as to hold the supporting frames 23 against movement in relation thereto; the jack-screw 48 being turned so as to bear on the saddle 42. The load of lumber or timbers is then stacked on the frames 23 and carried by the rollers thereon; the side frames 26 being placed in their upright position on opposite sides of the load to prevent lateral displacement of the latter. When it is desired to discharge the load one of the side frames 26, according to which side of the truck it is desired to unload, is lowered to such position that its outer end will be slightly inclined to the horizontal and in relation to the frames 23, in which position it is maintained by adjustment of the supporting legs 30. The frames 23 are then canted by first partially unscrewing the bolts 12 and operating the jack-screw 48 in such manner as to slightly elevate the frames 23, which, moving upward, carry the standards 9 therewith to move the pins 17 upward in the channels 20. The frames 23 can then be readily tilted at an incline toward the horizontally arranged side member 26, whereupon the lumber can be caused to travel over the rollers 29 and be discharged from the outer ends of the horizontal side frames 26. On the discharge of the load the jack-screws are retracted to re-position the frames 23 at normal, and the side frames 26 are restored to their vertical positions and retained therein by pins 28. It will be observed that the load on the frames 23 will be transmitted to the axles 5 and the wheels 8 through the pins 20, and if desired, through the jack-screws 48, which may be so adjusted as to support a portion of the load which will be distributed to the axle 5 through the saddle 42; which saddle serves to distribute the load when the frames are elevated by the jack-screws, as before described.

What I claim is:

1. A truck, comprising wheel-supported front and rear axles, a pair of adjustable standards on said axles, load supporting frames carried by said standards, hinged side frames on said supporting frame adapted to be disposed in either a horizontal or vertical position, and jack-screws connected to the load supporting frames adapted to coöperate with the axles whereby said load supporting frames can be elevated and canted in discharging a load.

2. In a truck, front and rear wheel-supported axles, adjustable standards mounted adjacent the ends of said axles, load supporting frames carried by said standards, rolls on said frames, side frames hinged to the ends of the supporting frames, rolls on the inner sides of said side frames, means for securing the side frames in a vertical position, adjustable means for supporting the outer ends of the side frames in approximately a horizontal position, and means for elevating the carrying frames in relation to the axles whereby they can be canted to facilitate the discharge of the load on either side of the truck.

3. In a truck, an axle having upturned end portions, standards U-shaped in cross section having side members extending on opposite sides of the upturned axle portions and formed with a series of opposed perforations, removable pins adapted to be received by said perforations and adapted to be supported on the upper ends of the axle end portions to support a load on the standards, means coöperating with said pins for clamping the standards against movement in relation to the axle, and a load carrying frame supported on said standards.

4. In a truck, an axle having upturned end portions, standards U-shaped in cross section having its side members extending on opposite sides of the upturned axle portions and formed with a series of opposed perforations, removable pins adapted to be received by said perforations and adapted to be supported on the upper ends of the axle end portions to support a load on the standards, means coöperating with said pins for clamping the standards against movement in relation to the axle, a load carrying frame supported on said standards, and a jack-screw interposed between the frame and the axle, whereby the frame and the standards thereon may be elevated in relation to the axle.

In witness that I claim the foregoing I have hereunto subscribed my name this 24th day of January, 1914.

WILLIAM J. H. SCHROEDER.

Witnesses:
EDMUND A. STRAUSE,
MARIE BATTEY.